May 5, 1936.                O. WITTEL                2,039,697
FOOTAGE INDICATOR FOR PHOTOGRAPHIC APPARATUS
Filed Jan. 2, 1932
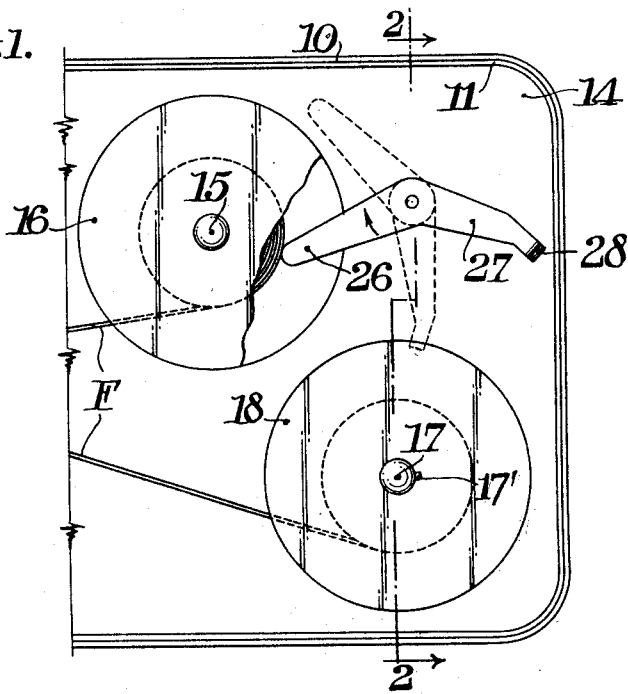
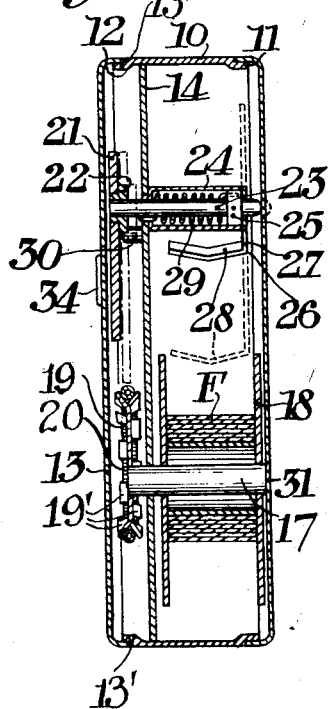
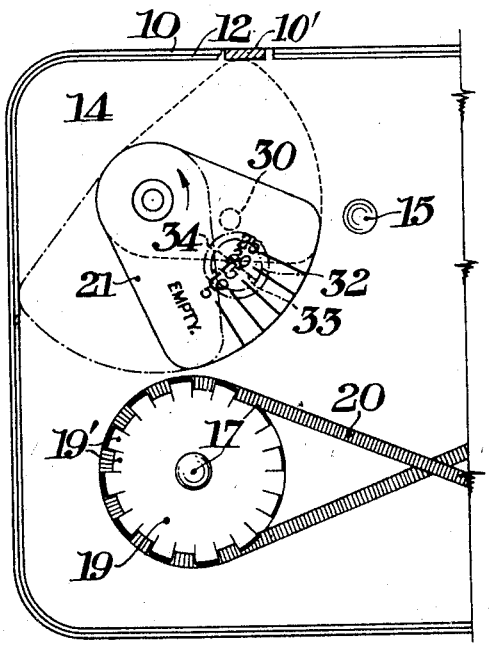
Inventor:
Otto Wittel,
Newton M. Perrin
George A. Gillette, Jr.
By
Attorneys.

Patented May 5, 1936

2,039,697

UNITED STATES PATENT OFFICE 2,039,697

FOOTAGE INDICATOR FOR PHOTOGRAPHIC APPARATUS

Otto Wittel, Rochester, N. Y., assignor to Eastman Kodak Company, Rochester, N. Y., a corporation of New York Application January 2, 1932, Serial No. 584,481

15 Claims. (Cl. 33—172)

The present invention relates to a footage indicator for photographic apparatus and more particularly to a footage indicator for motion picture apparatus.

The primary object of the present invention is the provision of a footage indicator which includes a lever adapted alternatively to assume a position in contact with the outer convolution of strip material on a supply reel or a position adjacent to the outer convolution of strip material on a take-up reel.

Another object of the present invention is the provision of a footage indicator which includes a dial plate adapted to assume various positions corresponding to the amount of strip material on the supply reel and adapted, after the strip material on the supply reel has decreased a predetermined amount, to strike against the casing of the photographic apparatus and to cause an audible signal.

A further object of the present invention is the provision of a footage indicator for photographic apparatus and which cooperates with a stop means so that a lever of the indicator may be held in an extreme position such that the loading or removal of strip material with respect to the apparatus is facilitated.

Still another object of the present invention is the provision of a stop means for the dial plate of a footage indicator, said stop means being tripped by the positioning of a casing cover on the casing of the apparatus.

A still further object of the present invention is the provision of an indicating means including a resilient means which tends to move the dial plate of the indicating means rotatably and axially.

Other and further objects of the present invention will be suggested to those skilled in the art as the following description is developed.

The invention broadly comprises an indicating means including a dial plate and a lever. The indicating means is rotatably mounted in the mechanism plate of a photographic apparatus and is also axially slidable. A single spring imparts to the indicating means the tendency to rotate and to slide axially. Said spring in one angular extreme position of the dial plate holds the indicating means in one axial extreme position against a stud which is located upon the mechanism plate and at the same time the lever is held in such a position that the apparatus may be readily loaded with strip material and reels. The casing cover of the apparatus is adapted to release the indicating means so that the lever makes contact with the outer convolution of strip material on the supply reel and the indicating means functions in the usual manner. After the removal of a predetermined amount of strip material from the supply reel, the lever of the indicating means by the action of said spring swings past the hub of the supply reel and the dial plate of the indicating means strikes against the casing of the apparatus to warn the operator that the strip material on the supply reel is depleted or nearing depletion.

Reference is hereby made to the accompanying drawing in which similar reference characters designate similar elements and in which:

Fig. 1 is a fragmentary front side elevation of a motion picture camera with the casing cover removed for better illustration of the internal members.

Fig. 2 is a vertical transverse cross-section of a motion picture camera having a footage indicator according to the invention and taken on the line 2—2 of Figure 1.

Fig. 3 is a fragmentary rear side elevation of a motion picture camera constructed according to the invention with the rear casing cover removed for better illustration of the internal members.

Although the footage indicator of the present invention is to be disclosed and described with respect to a motion picture camera, it is to be understood that the footage indicator of the invention may be employed with equal advantages in a motion picture projector or other type of photographic apparatus containing strip material, such as film, leader strips or backing paper, which may be wound upon film reeling means such as reels, spools or cores.

In the illustrated embodiment of the present invention, the motion picture camera comprises a casing 10 of rectangular formation and provided with rabbeted edges 11 and 12. A rear casing cover 13 encloses one side of the casing 10 in light-tight relation to the rabbeted edges 12 and is permanently attached thereto by pins 13'. A mechanism plate 14 is asymmetrically and longitudinally located within casing 10.

A supply reel spindle 15 is mounted in the mechanism plate 14. A film reeling means, such as a reel 16, is mounted upon spindle 15. Reel 16 is provided with an axial aperture which is adapted to fit over spindle 15 so that said reel 16 is rotatably supported by said spindle 15. A take-up reel spindle 17 is journaled in mechanism plate 14. A second film reeling means such as a reel 18 is mounted upon spindle 17. Reel 18 is provided with a notched axial aperture which is adapted to fit over spindle 17. A key 17' on spindle 17 engages the notch in the axial aperture of reel 18 so that said reel is driven in a known manner by spindle 17. The strip material such as film F is supplied on reel 16 and is wound up on the take-up reel 18. A pulley 19 is mounted upon the take-up reel spindle 17 and is on the opposite side of the mechanism plate 14 from the take-up reel 18. A spring belt 20 is driven by a spring motor, not shown, and encircles pulley 19 to drive the take-up reel spindle 17 and take-up reel 18 so that the strip material is wound thereon. The pulley 19 is made of a circular plate provided with radial slots around the periphery thereof, the portions 19' between said radial slots being bent alternately out of the plane of the plate to form the peripheral groove for the spring belt 20. It should be noted that pulley 19 is of extremely simple construction and allows minimum slip between the periphery thereof and the spring belt 20.

The motion picture camera as thus far described is well known in the art and forms no part of the present invention.

The indicating means of the footage indicator according to the invention, includes a dial plate 21 which is rotatably mounted and axially slidable with respect to mechanism plate 14. The dial plate 21 has a hub 22 which is attached to the end of a shaft 23. Shaft 23 passes through mechanism plate 14 and through the interior of a sleeve 24 which is attached to mechanism plate 14. A collar 25 is pinned to shaft 23 and forms a bearing for one end thereof within the sleeve 24. A bell crank lever is attached to shaft 23, being centrally apertured and driven onto said shaft 23 to turn therewith. The bell crank lever includes an arm 26 adapted to make sliding contact with the outer convolution of strip material on supply reel 16 and an arm 27 having an angular end 28 adapted to prevent uncoiling of the strip material from the take-up reel 18 when the bell crank lever 26, 27 is in the position shown by the broken lines in Figs. 1 and 2.

A resilient means, such as a coil spring 29, encircles the shaft 23 within sleeve 24. Spring 29 has one end inserted into the collar 25 and the other end inserted into the end of sleeve 24 which is attached to mechanism plate 14. Consequently, the resilient means is active in two directions since said spring 29 tends to rotate the dial plate 21 about the axis of shaft 23 and also to move the bell crank lever, shaft 23 and dial plate 21 axially. Coil spring 29 acts to rotate or bias arm 26 and dial plate 21 in the direction of the arcuate arrows thereon, see Figs. 1 and 3, respectively. The resilient means performs several functions, two of which will be explained at this time. First, the resilient means acts upon shaft 23 and arm 26 to hold the latter against the outer convolution of strip material on supply reel 16. Second, after the amount of strip material on supply reel 16 has been diminished by a predetermined amount, the resilient means will swing arm 26 past the strip material on supply reel 16 and will turn shaft 23 and dial plate 21 causing the latter to strike against the casing 10. When the dial plate 21 strikes against the casing 10 an audible signal, such as a click, is produced. Alternatively, a portion 10' may be set into casing 10 and located in the path of the dial plate 21. Portion 10' may be composed of any suitable bell metal to produce the tone and volume of sound desired when struck by dial plate 21. At the same time, the resilient means has moved arm 27 and angular end 28 into the position shown by the broken lines in Figs. 1 and 2 so that the free end of the strip material cannot uncoil from the take-up reel 18.

A stud 30 is attached to the mechanism plate 14 and is located as shown in Figs. 2 and 3. The front casing cover 31 is detachably affixed in light-tight relation to the casing 10 and at the same time maintains the shaft 23 in the position shown in full lines in Fig. 2. When the front casing cover 31 is removed for removal or loading of strip material into the camera, the shaft 23 and dial plate 21 are moved or tend to move axially under the action of coil spring 29. If the dial plate 21 is rotated into the position shown by the dot-dash lines in Fig. 3, shaft 23 and dial plate 21 will be moved axially by coil spring 29 into the position shown by the dot-dash lines in Fig. 2, and the edge of dial plate 21 will abut or be held against stud 30 by the rotatable action of coil spring 29. At the same time the rounded end of shaft 23 will project out to the position shown in dot-dash lines in Fig. 2. Thus it will be seen that the stud 30 acts as a stop means in conjunction with the resilient means or coil spring 29. When the stop means is operative, the bell crank lever is held so that the reels 16 and 18 may be readily inserted or removed. After loading, the operator may press the end of shaft 23 to release the stop means and bring arm 26 against the outer convolution of strip material on supply reel 16 or, if the operator fails to perform this operation, shaft 23 will be automatically moved axially against the action of the resilient means by the placement of front casing cover 31 in position.

The dial plate 21 may be provided with suitable legends and markings adapted to register with an index line on the casing. The legends and markings on dial plate 21 may be observed through a ruby window 32 provided with an index line 33 and mounted in the rear casing cover 13 by means of an annular ring 34.

For the purposes of the appended claims, the indicating means includes the dial plate 21, shaft 23 and the bell crank lever made up of arms 26 and 27, the resilient means includes the coil spring 29, and the stop means includes the stud 30.

Many modifications of the apparatus here disclosed may be made by those skilled in the art without departing from the scope of the invention.

Having now particularly described my invention, what I claim as new and desire to protect by Letters Patent of the United States is:

1. The combination with a photographic apparatus adapted to support a supply reel for containing strip material and adapted to support a take-up reel which is displaced from said supply reel, of an indicating means including an arm adapted to contact the strip material on said supply reel, and including another arm adapted to prevent uncoiling of strip material from the take-up reel, and a means for maintaining the first mentioned arm against the strip material on said supply reel and, after the removal of a predetermined amount of strip material from said supply reel, for moving the second mentioned arm adjacent to the strip material on said take-up reel.

2. The combination with a photographic apparatus adapted to support a supply reel containing strip material and a take-up reel receiving strip material, of an indicating means including a lever having one arm adapted to make contact with the strip material on said supply reel and having another arm adapted to prevent uncoiling of the strip material from the take-up reel and a resilient means for holding the first mentioned arm of said lever against the strip material on said supply reel and adapted, after a predetermined amount of strip material has passed from the supply reel to the take-up reel, to maintain said second mentioned arm of said lever in position to prevent uncoiling of the strip material on said take-up reel.

3. The combination with a photographic apparatus adapted to support a supply reel containing a strip material and a take-up reel receiving strip material, of a bell crank lever intermediately pivoted, having one arm adapted to make contact with the strip material on said supply reel and having another arm adapted to prevent uncoiling of the strip material from the take-up reel and a resilient means for holding the first mentioned arm of said lever against the strip material on said supply reel and adapted, after a predetermined amount of strip material has passed from the supply reel to the take-up reel, to maintain said second mentioned arm of said lever in position to prevent uncoiling of the strip material on said take-up reel.

4. The combination with a photographic apparatus adapted to support a supply reel containing strip material and a take-up reel receiving strip material, of a member which has two arms and which is intermediately pivoted, and a resilient means adapted normally to hold one of said arms against the outer convolutions of the strip material on said supply reel and to move the other arm adjacent to said take-up reel after a predetermined amount of strip material has been passed from the supply reel to the take-up reel.

5. In a photographic apparatus, the combination with a mechanism plate therein, of a dial plate rotatably mounted with respect to said mechanism plate and axially movable into two extreme positions, a stop means on said mechanism plate and adapted to maintain said dial plate in a definite angular position during one extreme axial position thereof and a resilient means connected to said dial plate for axially and rotatably moving the same and for holding the dial plate in said extreme axial position against the stop means.

6. In a photographic apparatus, the combination with a mechanism plate therein, of a dial plate rotatably mounted and axially movable into two extreme positions with respect to said mechanism plate, a stud on said mechanism plate adapted to maintain said dial plate in a definite angular position during one extreme axial position thereof and a spring having one end connected to the mechanism plate and the other end connected to the dial plate for moving said dial plate axially and rotatably and for holding said dial plate in said extreme axial position against the stud.

7. In a photographic apparatus, the combination with a casing adapted to contain a supply reel and a take-up reel having strip material thereon and a mechanism plate in said casing, of an indicating means having a shaft and including a lever and a dial plate in spaced relation on said shaft, said lever being adapted to contact the outer convolution of strip material on said supply reel until a predetermined amount of strip material has been reeled therefrom and said dial plate being adapted to swing against said casing after said predetermined amount of strip material has been removed from the supply reel whereby an audible signal is produced.

8. In a photographic apparatus, the combination with a casing adapted to contain a supply reel and a take-up reel both having strip material thereon and a mechanism plate in said casing, of an indicating means having a shaft rotatably mounted in said mechanism plate and including a lever and a dial plate in angular and spaced relation on said shaft, and a spring adapted to hold said lever against the outer convolutions of strip material on said supply reel and adapted to swing said dial plate against said casing after a predetermined amount of strip material has been removed from the supply reel whereby an audible signal is produced.

9. The combination with a photographic apparatus adapted to contain a roll of strip material, of an indicating means for denoting the amount of strip material in said roll and including an indicator and an arm both mounted to move simultaneously, said arm being adapted to contact the outer convolution of said roll, a stop means for engaging a portion of said indicating means and located to hold said arm during such engagement away from said outer convolution, and a resilient means connected to a portion of said indicating means for moving the same into engagement with said stop means and for moving said arm into contact with said outer convolution.

10. The combination with a photographic apparatus which is adapted to contain a flanged reel with strip material thereon, of an indicating means including a shaft, a dial plate thereon, and an arm also on said shaft and which is adapted to move between the flanges of said reel and into contact with the strip material on said reel, a stop means for engaging the dial plate of said indicating means and located so that during such engagement said arm is clear of the flanges of the reel to facilitate insertion of said reel, and a single resilient means connected to a portion of said indicating means, for maintaining said arm in contact with the strip material between the flanges of said reel and alternatively for maintaining said dial plate against said stop means with said arm clear of said flanged reel.

11. In a photographic apparatus, the combination with a mechanism plate, of an indicating means including a shaft supported by said mechanism plate but axially and rotatably movable with respect thereto and including a dial plate on said shaft and movable into two extreme and intermediate indicating positions, a spring tending to rotate and axially move said dial plate, and a stud on said mechanism plate adapted to abut said dial plate after movement to one of the extreme axial and rotatable positions thereof to hold the same in non-indicating position.

12. In a photographic apparatus, the combination with a casing and a mechanism plate therein, of an indicating means rotatably and axially movable into two extreme positions within said casing, a stop means adapted to hold said indicating means in a definite angular position during one extreme axial position thereof, a resilient means normally moving said indicating means out of said definite angular position and into said extreme axial position, and a casing cover adapted to move said indicating means into the other extreme axial position whereby the indicating means is released to move under the action of said spring when the casing cover is on the casing.

13. In a photographic apparatus, the combination with a casing, a mechanism plate therein, of a shaft mounted in said mechanism plate and rotatably and axially movable into extreme positions, a dial plate mounted on one end of said shaft, a stud on said mechanism plate and adapted to hold said dial plate in one rotatable extreme position during one axial extreme position of said shaft, a coil spring encircling said shaft, connected thereto and to said mechanism plate, and a casing cover adapted to move said shaft into the other extreme position whereby the dial plate is moved by said coil spring when the casing cover is on the casing.

14. In a photographic apparatus, the combination with a casing adapted to contain reels having strip material thereon and a mechanism plate in said casing, of an indicating means including a shaft rotatably and axially movable within said casing, a dial plate on said shaft and movable into two extreme positions within said casing, and a lever on said shaft and adapted to engage the outer convolution of the strip material on one of said reels, a stop means adapted to abut and hold said dial plate and said lever in a definite position during one extreme position of said indicating means and a resilient means normally moving said indicating means toward the other rotatable extreme position whereby said lever is held away from either reel by the stop means.

15. In a photographic apparatus, the combination with a casing adapted to contain reels having strip material thereon and a mechanism plate in said casing, of an indicating means having a shaft rotatably and axially movable within said mechanism plate, a dial plate on said shaft and movable into two extreme positions within said casing and a lever on said shaft and adapted to engage the outer convolution of the strip material on one of said reels, a stop means adapted to abut and hold said dial plate and said lever in a definite position during one extreme position of said indicating means, and a resilient means normally moving said indicating means toward the other rotatable extreme position and a casing cover adapted to move said indicating means into the other extreme axial position whereby the lever arm is moved to engage the outer convolution of strip material on one of the reels when the casing cover is in position.

OTTO WITTEL.